(12) United States Patent
Collier, Jr.

(10) Patent No.: US 6,508,209 B1
(45) Date of Patent: Jan. 21, 2003

(54) REFORMED NATURAL GAS FOR POWERING AN INTERNAL COMBUSTION ENGINE

(76) Inventor: R. Kirk Collier, Jr., NRG Technologies, Inc. 681 Edison Way, Reno, NV (US) 89502

( * ) Notice: Subject to any disclaimer, the term of this patent is extended or adjusted under 35 U.S.C. 154(b) by 0 days.

(21) Appl. No.: 09/541,541

(22) Filed: Apr. 3, 2000

(51) Int. Cl.⁷ .............................................. F02M 27/02
(52) U.S. Cl. .......................................................... 123/3
(58) Field of Search ............................. 123/3, 1 A, 527

(56) References Cited

U.S. PATENT DOCUMENTS

| | | | |
|---|---|---|---|
| 1,628,066 A | 5/1927 | Rose | |
| 1,936,155 A | 11/1933 | Florez | 48/199 |
| 3,759,678 A | 9/1973 | Chamberland et al. | 48/214 |
| 3,825,487 A | 7/1974 | Wilhelm | 208/139 |

(List continued on next page.)

FOREIGN PATENT DOCUMENTS

| | | |
|---|---|---|
| DE | 3048540 | 7/1982 |
| GB | 2258012 | 1/1993 |
| JP | 61171870 | 2/1986 |
| JP | 2116603 | 10/1988 |
| JP | 5-200252 | 8/1993 |
| WO | 8500159 | 1/1985 |
| WO | 9423188 | 10/1994 |

*Primary Examiner*—Marguerite McMahon
*Assistant Examiner*—Hyder Ali
(74) *Attorney, Agent, or Firm*—Christie, Parker & Hale, LLP

(57) ABSTRACT

A method of operating an internal combustion engine comprising the steps of providing an internal combustion engine and a source of gaseous fuel such as natural gas or propane for powering the engine. Also, there is provided a reactor in fluid communication with said engine for reforming the gaseous fuel. The natural gas is added to the reactor for purposes of converting or reforming a portion of the natural gas to $H_2$ and CO to provide a gaseous mixture exiting the reactor comprised of methane, $H_2$ and CO. The gaseous mixture is mixed with air to provide a gaseous mixture and air combination. The gaseous mixture and air combination is introduced to the internal combustion engine and combusted to provide an exhaust gas. A portion of the exhaust gas is recycled and introduced to the reactor for purposes of reforming the gaseous fuel.

25 Claims, 5 Drawing Sheets

U.S. PATENT DOCUMENTS

| | | | |
|---|---|---|---|
| 3,855,980 A | 12/1974 | Weisz et al. ................... | 123/3 |
| 3,918,412 A | * 11/1975 | Lindstrom ..................... | 123/3 |
| 3,929,431 A | 12/1975 | Koh et al. ..................... | 48/214 |
| 3,943,236 A | 3/1976 | Green ........................... | 423/415 |
| 4,059,076 A | 11/1977 | Kosaka et al. | |
| 4,073,716 A | 2/1978 | Pfefferle et al. .............. | 208/66 |
| 4,147,136 A | 4/1979 | Noguchi et al. ............... | 123/3 |
| 4,175,386 A | 11/1979 | Katahira et al. .............. | 60/276 |
| 4,199,938 A | 4/1980 | Nakase et al. ................ | 60/274 |
| 4,244,328 A | 1/1981 | Lindstrom ..................... | 123/8 |
| 4,318,369 A | 3/1982 | Cronyn .......................... | 123/3 |
| 4,337,170 A | 6/1982 | Fuderer ........................ | 252/373 |
| 4,340,013 A | 7/1982 | Lindstrom ..................... | 123/3 |
| 4,358,364 A | 11/1982 | Klosek et al. ................. | 208/92 |
| 4,375,746 A | 3/1983 | Hattori ......................... | 60/274 |
| 4,425,876 A | 1/1984 | Rutledge et al. ............... | 123/3 |
| 4,444,158 A | 4/1984 | Yoon ........................... | 123/1 A |
| 4,473,490 A | 9/1984 | Stewart ........................ | 252/373 |
| 4,475,484 A | 10/1984 | Filho et al. .................... | 123/3 |
| 4,476,817 A | 10/1984 | Lindberg ....................... | 123/3 |
| 4,547,356 A | 10/1985 | Papineau ...................... | 423/658 |
| 4,635,609 A | 1/1987 | Seppen et al. | |
| 4,643,666 A | 2/1987 | Green et al. ................... | 431/4 |
| 4,900,333 A | 2/1990 | Bos .............................. | 48/197 |
| 4,919,844 A | 4/1990 | Wang .......................... | 252/373 |
| 5,004,592 A | 4/1991 | Pinto ........................... | 423/652 |
| 5,081,977 A | 1/1992 | Swenson | |
| 5,156,114 A | 10/1992 | Gunnerman ................. | 123/1 A |
| 5,297,515 A | 3/1994 | Gale et al. ..................... | 123/3 |
| 5,339,634 A | 8/1994 | Gale et al. | |
| 5,388,402 A | 2/1995 | Aoki et al. .................... | 60/276 |
| 5,410,872 A | 5/1995 | Adamczyk, Jr. et al. ...... | 60/274 |
| 5,448,885 A | 9/1995 | Atanasyan ................... | 60/274 |
| 5,488,932 A | 2/1996 | Serafini ......................... | 123/3 |
| 5,592,925 A | 1/1997 | Machida et al. ............. | 123/568 |
| 5,609,144 A | 3/1997 | Seizew et al. ............... | 123/568 |
| 5,660,602 A | 8/1997 | Collier, Jr. et al. ......... | 48/127.3 |
| 5,666,923 A | 9/1997 | Collier, Jr. et al. ......... | 123/488 |
| 5,671,600 A | 9/1997 | Pischinger et al. ........... | 60/605 |
| 5,720,266 A | 2/1998 | Nogi et al. | |
| 5,725,616 A | 3/1998 | Lynum et al. .............. | 48/127.3 |
| 5,763,351 A | 6/1998 | Ichimura ..................... | 502/303 |
| 5,787,864 A | 8/1998 | Collier, Jr. et al. ......... | 123/492 |
| 5,814,283 A | 9/1998 | Matuoka et al. ............. | 422/172 |
| 5,852,927 A | 12/1998 | Cohn et al. .................. | 60/39.05 |
| 5,947,063 A | 9/1999 | Smith et al. | |
| 5,972,829 A | 10/1999 | Ichimura ..................... | 502/303 |
| 6,026,787 A | * 2/2000 | Sun et al. ..................... | 123/525 |
| 6,079,373 A | 6/2000 | Kawamura | |

* cited by examiner

REFORMED NATURAL GAS FOR POWERING AN INTERNAL COMBUSTION ENGINE

BACKGROUND OF THE INVENTION

This invention relates to gaseous fuel powered internal combustion engines and more particularly it relates to a method of operating an internal combustion engine using reformed natural gas to produce exhaust gas having near-zero $NO_x$.

Natural gas is considered an excellent source of fuel for an internal combustion engine because it burns cleaner and there exist large reserves of natural gas. However, the use of natural gas to fuel internal combustion engines is not without problems. For example, there is no easy method of refueling vehicles employing natural gas. Further, natural gas requires more fuel tank volume to obtain equivalent miles when compared to diesel or gasoline powered vehicles. In addition, the use of natural gas for fuel for an internal combustion engine can result in exhaust emission problems requiring combinations of exhaust gas recirculation, positive crankcase ventilation, and catalytic converters to care for the various compounds in the exhaust gases. For example, U.S. Pat. Nos. 5,660,602; 5,666,923 and 5,787,864 discloses alternative gaseous fuel for operating a combustion engine including approximately 21 to 50% hydrogen and the rest natural gas constituents such as combinations of methane, carbon dioxide, nitrogen, ethane, propane, iso-butane, n-butane, iso-pentane, n-pentane, and hexanes plus. Current production engines without any substantial modifications can use such alternative fuel which is lean burning and emits emissions that are below current legal standards.

It is also known to reform methanol to produce hydrogen for use with gasoline for internal combustion engines to reduce noxious components. For example, U.S. Pat. No. 4,244,328 and 4,340,013 disclose an improved process and apparatus for preparing a gaseous mixture of hydrocarbon and carbon monoxide to be supplied to the air/fuel mixture of a combustion engine. The process and apparatus are useful in reducing the amount of noxious components and aldehydes in the engine exhaust gas. In one embodiment of the invention an improved process and combustion engine are provided for reducing the noxious components and aldehydes.

U.S. Pat. No. 4,147,136 discloses a fuel reforming system for an internal combustion engine which has a fuel reforming reactor to be supplied with a hydrocarbon fuel. The reactor contains a catalyst carrier and a catalyst thereon to be heated for facilitating a conversion of the fuel into a reformed gaseous mixture rich with hydrogen which mixture is to be fed into the engine. The catalyst is periodically alternately exposed to the fuel and air so that carbon produced and deposited on the catalyst during the fuel reforming reaction facilitated by the catalyst is burnt away from the catalyst carrier and the catalyst thereon whereby the catalytic performance of the catalyst is restored to ensure a prolonged operative life thereof The reformed gaseous mixture assures a reliable ignition and combustion of a mixture thereof with air in the engine at a very lean air-fuel ratio to advantageously decrease the emission of harmful components of engine exhaust gas.

U.S. Pat. No. 4,476,817 discloses a combustion and pollution control system wherein a controlled amount of a fluid (steam or water or a solution of water plus additives) is injected into an internal combustion engine to improve combustion, efficiency, and to reduce emissions. The amount of the fluid injected is controlled in response to engine need. The steam is generated by the heat produced by the engine. Combustion gas temperature is used to control the amount of steam produced by varying the fluid flow through one or more fixed or variable orifice control valves. The stream is injected in a piston engine to cool peak temperatures, to prevent detonation and pre-ignition, to smooth out hot spots, to prevent auto-ignition or dieseling, and to use the vapor energy in the expansion cycle to increase low speed torque and acceleration. The steam is used to cause full retard of the vacuum spark advance during acceleration at full load from low speed, and a large amount of steam is injected at this point in the cycle to prevent pre-ignition and detonation. Ultrasonic energy is added to the injected steam to produce better mixing and distribution. Hydrogen is also injected to permit better combustion with higher amounts of air. The hydrogen is produced by the interaction of a catalyst on the steam and fuel hydrocarbons and ultrasonic energy. At times exhaust gas and other additives, such as hydrogen peroxide, methyl alcohol and ammonia are injected.

U.S. Pat. No. 4,318,369 discloses a recyclable-fuel engine system designed for use in a vehicle. The system includes a hydrogen-producing catalytic unit having plural catalytic beds, and a hydrogen-fueled engine having combustion and exhaust chambers. The catalytic beds, when supplied with heat, catalyze a reduced form of a hydrocarbon carrier to hydrogen and a dehydrogenated form of the carrier. One of the catalytic beds is supplied heat by direct heat transfer from the engine's exhaust chamber. The remaining catalytic beds are supplied heat by heat pipes receiving heat from the combustion and exhaust chambers. The hydrogen produced in the catalytic unit is supplied to the engine, to power the same. Also disclosed are apparatus and method for regenerating the catalytic beds periodically.

U.S. Pat. No. 4,425,876 discloses a method of fuel treatment and distribution for an internal combustion engine including the steps of operating an adiabatic reactor without a substantial amount of exhaust heat within an operational temperature range, the catalyst bed reactor including a partial combustion catalyst and a dissociation catalyst. A substantial amount of engine exhaust heat is provided to an endothermic reactor having an endothermic dissociation catalyst therein and liquid alcohol is vaporized to form alcohol vapor. The alcohol vapor is mixed with air to form a partial combustion mixture which is contacted with the partial combustion catalyst whereby a dissociation mixture is formed and heat is evolved. The dissociation mixture and the dissociation catalyst form a hydrogen-rich fuel. The hydrogen-rich fuel and the endothermic dissociation catalyst form a fuel product whereby at least a portion of any residual undissociated alcohol in the hydrogen-rich fuel is dissociated to hydrogen and carbon monoxide using the engine waste heat provided by the exhaust gas.

U.S. Pat. No. 4,444,158 discloses a method of methyl alcohol treatment for an automobile internal combustion engine wherein the methyl alcohol is converted to a hydrogen-rich fuel for burning in the internal combustion engine.

U.S. Pat. No. 4,475,484 discloses an apparatus for the catalytic transformation of fuel for use with an internal combustion engine. The apparatus comprises a catalytic reactor in the form of a chamber containing catalytic material, and through which liquid or vaporized fuel is passed, the reactor chamber being in close thermal communication with the exhaust gases leaving the internal combustion engine. Said reactor chamber is either placed within the exhaust gas chamber of the engine exhaust manifold, or in very close proximity thereto. In a preferred arrangement, there are two reactor chambers in series, one being formed within the exhaust manifold of the engine, and the other being mounted closely adjacent thereto.

U.S. Pat. No. 4,547,356 discloses a method for generating hydrogen. The system includes a reactor that has reaction zones wherein catalyst and elevated temperatures generate hydrogen from steam. The zones in the reactor are in the form of tubes about a heat generating chamber, and the zones are adapted to be interconnected to each other, to atmosphere, and to the source of steam, all to maximize the generation of hydrogen by providing a reactor of optimum flexibility.

U.S. Pat. No. 5,156,114 discloses an aqueous fuel for an internal combustion engine. The fuel comprises water from about 20 percent to about 80 percent by volume of the total volume of said fuel, and a carbonaceous fuel selected from the class consisting of ethanol, methanol, gasoline, kerosene fuel, diesel fuel, carbon-containing gaseous or liquid fuel, diesel fuel, carbon-containing gaseous or liquid fuel, or mixtures thereof. A method for combusting an aqueous fuel in an internal combustion engine is provided. The method produces approximately as much power as the same volume of gasoline. The method comprises introducing air and aqueous fuel into a fuel introduction system for the engine. The fuel comprises water from about 20 percent to about 80 percent by volume of the total volume of the fuel, and a carbonaceous fuel from ethanol, methanol, gasoline, kerosene fuel, diesel fuel, carbon-containing gaseous or liquid fuel, or mixtures thereof, and introducing and combusting said air/fuel mixture in a combustion chamber or chambers in the presence of a hydrogen producing catalyst to operate the engine.

U.S. Pat. No. 5,297,515 discloses an engine which, in at least one cylinder or combustion area, is provided with a hydrocarbon rich fuel which produces upon combustion an exhaust gas containing unburned hydrocarbons, water vapor and carbon monoxide. The exhaust gas is treated in a catalytic converter and the reaction process that occurs therein produces hydrogen and carbon dioxide which is mixed with air to form a hydrocarbon lean, hydrogen enriched mixture. The mixture is subsequently ignited in other cylinders or combustion areas of the engine to produce power.

U.S. Pat. No. 5,488,932 discloses a gaseous fuel-enriching subsystem for an internal combustion engine including a supplemental intake conduit to an intake manifold internal combustion engine. Such supplemental input is provided with numerous apertures therein. An exhaust gas conduit from the internal combustion engine annularly surrounds the intake conduit permitting fuel values from exhaust in the exhaust conduit to enter the supplemental intake conduit through such apertures. A water supply input to the supplemental intake conduit, at an end opposite to the location of the manifold, provides a further fuel input to the supplemental intake conduit in that water from the water supply is evaporated and then hydrolyzed, separating the water into its chemical constituents of hydrogen and oxygen, thusly producing an enriched gaseous fuel mixture with the recycled exhaust gas which is fed to the manifold.

In spite of these disclosures, there is still required a method of operating an internal combustion engine on a gaseous fuel such as natural gas or propane which permits lean burn and which results in the generation of near-zero $NO_x$.

SUMMARY OF THE INVENTION

It is an object of this invention to provide a method of operating an internal combustion engine.

It is a further object of this invention to provide an improved method of operating a combustion engine to provide an exhaust gas having near-zero $NO_x$.

It is still another object of the invention to provide an improved method for operating a combustion engine on gaseous fuel such as natural gas or propane or the like to provide an exhaust gas having near-zero $NO_x$.

Yet it is another object of the invention to provide an improved method for operating an internal combustion engine on a gaseous fuel such as natural gas or propane including the step of reforming the gaseous fuel to produce hydrogen and carbon monoxide.

These and other objects will become apparent from a reading of the specification and claims appended hereto.

In accordance with these objects, there is provided a method of operating an internal combustion engine comprising the steps of providing an internal combustion engine and a source of gaseous fuel such as natural gas or propane for powering the engine. Also, there is provided a reactor in fluid communication with the engine for reforming the gaseous fuel. The natural gas and/or propane is added to the reactor for purposes of converting or reforming a portion of the gaseous fuel to hydrogen and carbon monoxide to provide a gaseous mixture exiting said reactor comprised of methane, and/or propane, hydrogen, steam, nitrogen, carbon dioxide, and carbon monoxide. The gaseous mixture is mixed with air to provide a gaseous fuel mixture and air combination which is introduced to the internal combustion engine and combusted to provide an exhaust gas. A portion of the exhaust gas from the internal combustion engine is recycled and introduced to the reactor for purposes of reforming a portion of the gaseous fuel to hydrogen and carbon monoxide.

DETAILED DESCRIPTION OF THE PREFERRED EMBODIMENT

Figure 1:
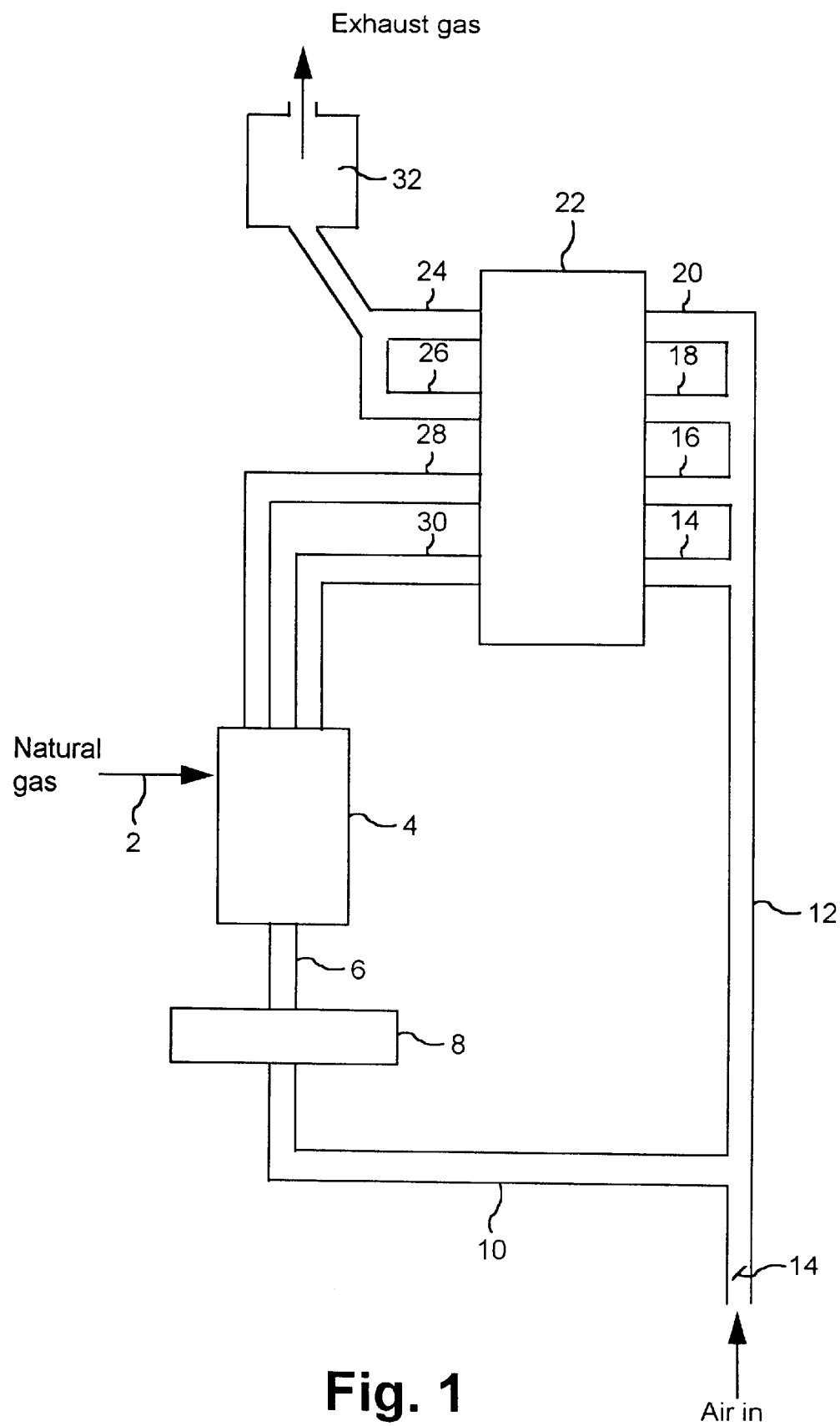
FIG. 1 is a schematic representation showing steps in operating an internal combustion engine to provide exhaust gases having near-zero $NO_x$.

Referring now to FIG. 1, there is shown a novel method for operating an internal combustion engine on a gaseous fuel such as natural gas or propane gas to produce exhaust gases having near-zero $NO_x$. In FIG. 1, the gaseous fuel is introduced along line 2 to a reactor 4 where the gas, e.g., natural gas, is reformed to produce a fuel containing methane, hydrogen, carbon monoxide, and other gases. The fuel is removed from reactor 4 along line 6 and is optionally passed through a heat exchanger 8 which is effective in removing or condensing water therefrom. The fuel is further removed along line 10 to line 12. Air is introduced to line 12 through throttle 14 where the air is mixed with fuel from reactor 4 to provide a combination fuel mixture. The fuel mixture is introduced along intake lines 14, 16, 18 and 20 to a combustion zone of internal combustion engine 22 where the combination fuel mixture is combusted to produce power and exhaust gases. Typically, the internal combustion engine is a reciprocating piston engine.

FIG. 1 illustrates four reciprocating pistons. In the invention, the engine exhaust gases are extracted along lines 24, 26, 28 and 30. In FIG. 1, lines 24 and 26 are shown venting exhaust gases to the atmosphere. However, it will be appreciated that the portion of exhaust gases vented to the atmosphere can be increased or decreased as required. In FIG. 1, lines 28 and 30 are introduced to reactor 4 where the exhaust gases are used to treat the gaseous fuel for purposes of reforming at least a portion of the fuel to produce hydrogen and carbon monoxide. That is, an exhaust gas stream from the internal combustion engine is recycled to reactor 4 where the exhaust gas stream may be mixed with stream 2 of natural gas for purposes of reforming. Because the exhaust gas contains steam, the natural gas is catalytically steam reformed in the reactor in the presence of the exhaust gases to form a gaseous mixture containing hydrogen and carbon monoxide. Further, because the steam reforming reaction is endothermic, energy required for converting at least a portion of the natural gas to hydrogen and carbon monoxide is supplied by the temperature of the exhaust gases introduced from lines 28 and 30. Any methane in the natural gas not reformed is used as fuel in the internal combustion engine. Thus, the present invention is highly effective in permitting operation of an internal combustion engine with an exhaust gas having near-zero $NO_x$.

For purposes of producing near-zero $NO_x$, in the present invention, the gaseous fuel charge submitted to the internal combustion engine is subject to charge dilution when mixed with exhaust gas used for reforming purposes. By introducing additional gases to the combustion process for a given amount of fuel, the heat capacity of the gases used in the combustion process is increased. This increase in heat capacity reduces the peak temperature of the combustion process which is very important in producing near-zero $NO_x$. In the present invention, the use of exhaust gas to reform fuel by mixing results in dilution of the combustion gases charged to the internal combustion engine. Exhaust gas has a higher heat capacity than an equivalent volume of air. Thus, the use of exhaust gas as a charge dilution gas is more effective in reducing $NO_x$ emission in an engine because of its higher heat capacity per unit volume compared to air.

However, dilution of the combustion charge to produce near-zero $NO_x$ has the problem of producing a negative combustion effect referred to herein as misfire. With conventional fuels, misfire will normally occur before sufficient charge dilution gases are incorporated to produce near-zero $NO_x$. Thus, it is important to provide a combustible gas in the fuel to eliminate misfire in the engine. In the present invention, a combustible gas mixture that reduces misfire is hydrogen and carbon monoxide which is generated during reforming. That is, the mixture of hydrogen and carbon monoxide generated during reformation of the natural gas eliminates engine misfire under exhaust gas charge dilution to produce near-zero $NO_x$.

Additional hydrogen or carbon monoxide may be added to the reformed gaseous fuel, if necessary. Or, if desirable, the reformed gaseous fuel, including recirculated exhaust gas, may be combined with an unreformed fuel such as a separate source of natural gas or propane.

Another air contaminant that is important to reduce is carbon monoxide in the exhaust gas. Thus, exhaust gases 24 and 26 can be passed through an exhaust catalyst to convert remaining CO to $CO_2$ to provide near-zero CO. That is, as shown in FIG. 1, exhaust in line 26 is introduced to line 24 and both are passed through an exhaust catalyst 32 to provide an exhaust gas having near-zero CO.

Catalytic converter 32 is an oxidizing catalyst which converts carbon monoxide to carbon dioxide before being discharged. Thus, while exhaust gas recirculation is used in the present invention to reform the fuel to provide hydrogen and carbon monoxide, and to provide charge dilution to achieve low or near-zero $NO_x$ emissions, a control level of lean burn is required to provide sufficient oxygen in the exhaust gas for purposes of converting carbon monoxide to carbon dioxide. Lean burn conditions are used to provide about 0.5 to 4% oxygen in the exhaust gas. For purposes of the invention, the amount of lean burn required is obtained by regulating the amount of fuel introduced to the reactor. The appropriate amount of fuel can be determined by an oxygen sensor placed in exhaust stream 24 or 26 of FIG. 1. Or, the amount of fuel can be regulated by knowing the mass flow rate of air and fuel. In the present invention, the amount of carbon monoxide will range between 200 to 600 ppm between the limits of 0.5 to 4% oxygen. Further, in the present invention, an equivalence ratio ($\Phi$) based on fuel to air ratio of 0.98 will produce approximately 0.5% oxygen in the exhaust gas and an equivalence ratio of 0.8 will produce approximately 4% oxygen in the exhaust gas.

It should be noted that providing oxygen in the exhaust gas is also beneficial in steam reforming. The oxygen present in exhaust gas results in oxidation reactions taking place during the steam reforming wherein hydrocarbons, carbon monoxide and hydrogen react to produce carbon dioxide and water. Steam reforming proceeds by an endothermic reaction and as a result temperature of the exhaust gas drops as the reforming reaction proceeds. As the temperature drops, the reaction equilibrium tends to shift to favor formation of hydrocarbons rather than hydrogen and carbon monoxide. However, it has been discovered that by combining the oxidation reaction which is exothermic with the reforming reaction, energy is recovered to aid in the reformation reaction. The level of oxidation talking place can be controlled by controlling the amount of fuel introduced to reactor 4 for a given amount of air entering engine 22 which is controlled by throttle 14. Thus, when exhaust gas is used for reforming, the amount of oxygen in the exhaust gas can be controlled by air-fuel ratio. If the exhaust gas is not mixed with gaseous fuel in the reactor, then a metered amount of oxygen or air can be introduced to the reactor 4 with the fuel and water required for reformation.

Figure 2:
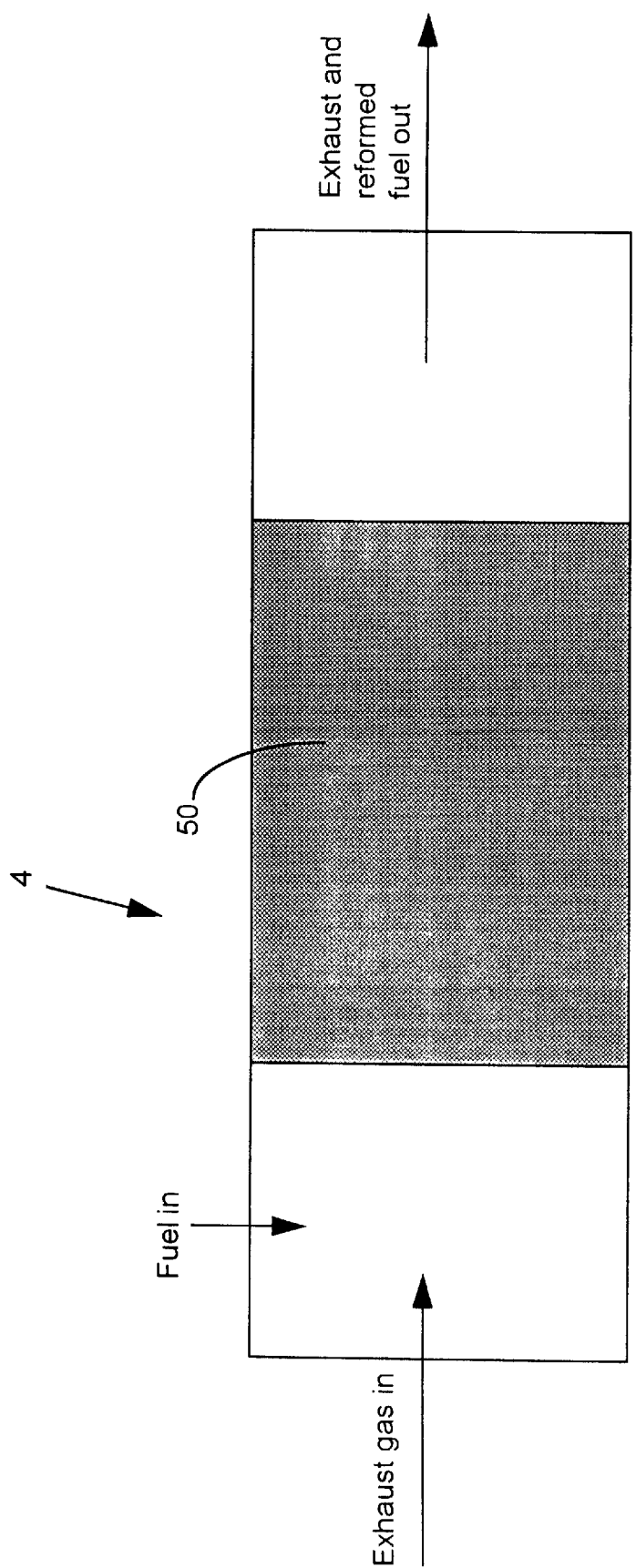
FIG. 2 is a schematic of a reformer reactor useful in the invention where the exhaust gas is commingled with the fuel, water and air charge.

It should be noted that charge dilution occurs when exhaust gas is recirculated and combined with the gaseous fuel in a reformer reactor as shown in FIG. 2. In reformer reactor 4 of FIG. 2, exhaust gas being recirculated is commingled with fuel before passing over catalyst bed 50 where reforming occurs and at least a portion of the fuel is reformed to hydrogen and carbon monoxide. The reformed fuel diluted with exhaust gas is directed to a combustion zone of the engine. Thus, it will be seen that significant dilution of the fuel charge can be achieved to produce exhaust gas having near-zero $NO_x$.

Figure 3:
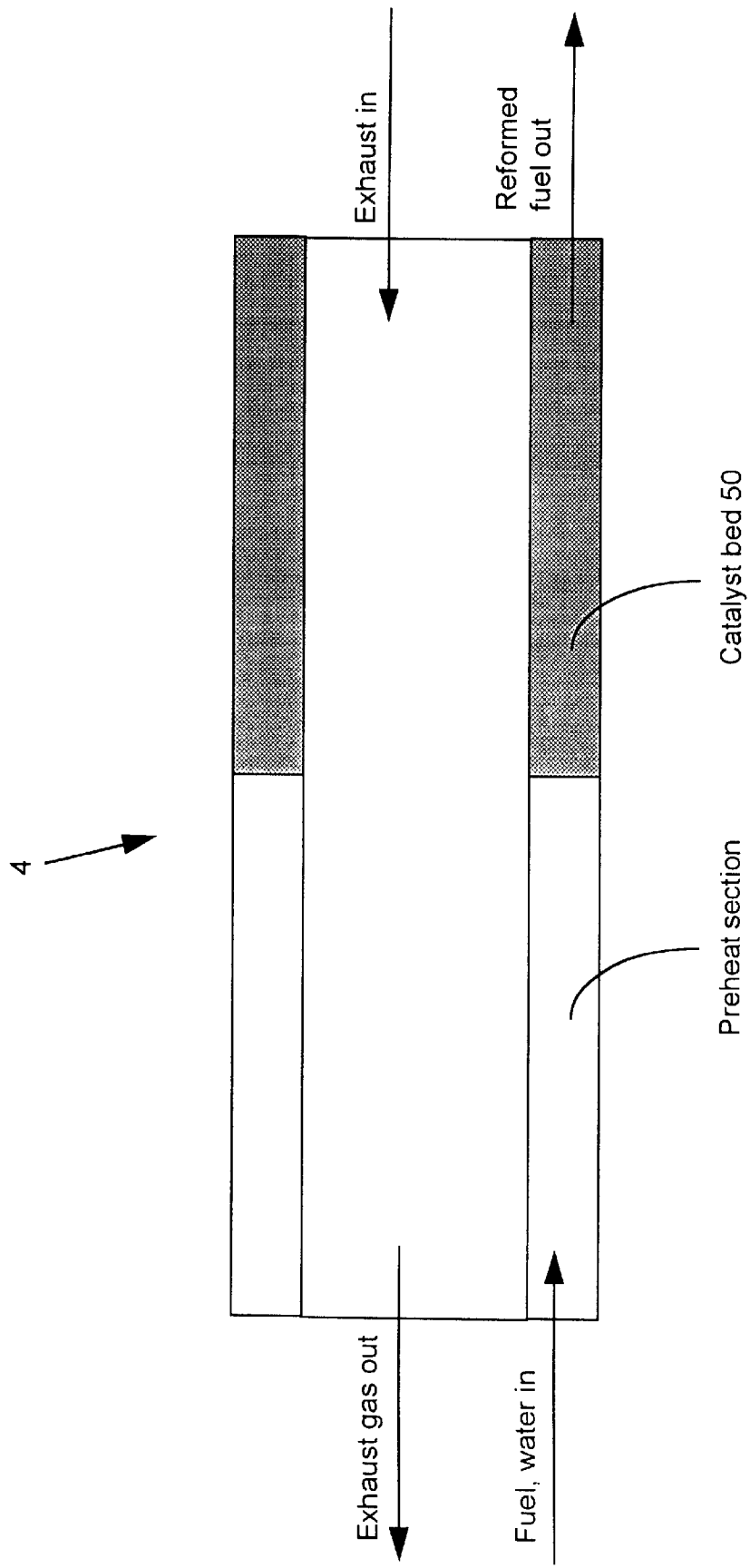
FIG. 3 is a schematic of a reformer reactor useful in the invention where the exhaust can be withdrawn separate from the reformed fuel.

Referring now to FIG. 3, it will be noted that reformation can be accomplished without diluting the combustion charge with exhaust gas. In reformer reactor 4, the catalyst bed 50 is contained between two concentric cylinders and the fuel, water and air are introduced to catalyst bed 50 between said cylinders. Exhaust gas is shown introduced to the inside of the smaller cylinder and is used for preheating the fuel and water as well as the catalyst bed for purposes of reforming the fuel. The exhaust gas can then be discharged or a portion thereof commingled with the reformed fuel for charge dilution, if desired. The reformed fuel can be withdrawn from the catalyst bed separate from the exhaust gas, if desired.

While the invention has been described mainly with respect to natural gas, it will be understood that the invention has application to any gaseous fuel. While natural gas is comprised mainly of methane, it can include minor amounts of ethane, propane, butanes, pentanes, hexanes and carbon dioxide and such is included within the definition of natural gas as used herein. By the use of the term gaseous fuel as used herein is meant to include natural gas and any of the constituents comprising natural gas, as for example, propane gas which can be made available as liquid propane.

Reactor or reformer 4 is comprised of any suitable catalyst coated on rashig rings or similar carrier or the catalyst may be coated on a monolith comprised of cordierite. The catalyst may be comprised of any metal which promotes the reformation reaction. The preferred catalyst is nickel.

The reactor or reformer may be operated at a temperature which suitably reforms a substantial amount of natural gas into hydrogen and carbon monoxide. The ratio of gaseous fuel to exhaust gas entering reactor 4 is important and the ratio can range from about 0.02 to 0.35.

The desired molar ratio of methane to hydrogen plus carbon monoxide is about 2.4. However, depending upon the power requirements of the engine, the ratio can increase to 4 when the specific power requirements of the engine are low. More broadly, this ratio can range from 1 to 4. The temperature of operation of reactor 4 can range from about 450° to 800° C., depending to some extent on the space velocity within the reactor and the amount of reformation. It is preferred to operate the reactor at the highest possible temperature for reformation purposes. However, higher reactor temperatures can result in higher $NO_x$ emissions. Thus, a preferred range of operation for the reactor is about 500° to about 600° C.

For purposes of reforming natural gas, heat is supplied by the exhaust gases introduced along lines 28 and 30. However, the natural gas may also be heated prior to being introduced to reformer 4. That is, the natural gas may be preheated in a heat exchanger using heat from the exhaust gases or using heat from the reformed fuel in line 6.

In the present invention, fuel gases exiting reformer 4 or reformed gases have a temperature in the range of 400° to 600° C. and typically can contain 1 to 10 molar percent water. It should be noted that it is preferred to cool the reformed gases for purposes of increasing the charge density of gases entering engine 22 for purposes of increasing maximum power output as well as inhibiting engine knock. Further, it is important to cool the reformed gases in order to condense out water contained therein to avoid its interference with engine performance. Preferably, the reformed gases exiting reformer 4 are cooled in condenser 8 to a temperature in the range of 55° to 120° F.

As noted earlier, the reformed gases are mixed with air for purposes of combustion in internal combustion engine 22. For purposes of the present invention, the reformed gases are combined with air in a ratio of reformed gases to air of 0.2 to 1 and preferably in a ratio range of reformed gases to air of 0.4 to 0.67 for introducing to internal combustion engine 22.

It will be understood that the invention can be applied to different kinds of internal combustion engines, including without limitation reciprocating piston engines, Wankel engines and gas turbine engines.

While two lines 28 and 30 are shown in FIG. 1, the exhaust gas recirculation to reformer 4 can be adjusted upwardly or downwardly as required. Thus, the exhaust gas recirculation to reformer 4 can range between 25 to 65%, preferably 30 to 60% of the total exhaust gases leaving engine 22.

In the present invention, the exhaust gases leaving engine 22 are comprised mainly of carbon dioxide, carbon monoxide, nitrogen, and water vapor. Typically, the carbon dioxide is in the range of 5 to 6%, nitrogen in the range of 74 to 79%, and water vapor in the range of 6 to 12%. The invention has the ability to operate an internal combustion engine to produce an exhaust gas having near-zero $NO_x$. By the term near-zero $NO_x$ is meant that the exhaust gas contains less than about 10 ppm $NO_x$. By the term near-zero CO is meant that the exhaust gas discharged to the atmosphere has less than 5 ppm CO.

The present invention provides for an improved combustion engine which emits an exhaust gas containing reduced amounts of $NO_x$ and CO. The engine is in fluid communication with a reactor for reforming at least a portion of the gaseous fuel for combustion in the engine. Means are provided for introducing gaseous fuel to the reactor for reforming and means is provided for recycling a portion of the exhaust gas from the internal combustion engine to the reactor for reforming at least 10% of the gaseous fuel. Further, means are provided in the reactor for catalytically steam reforming the gaseous fuel, e.g., natural gas or propane gas, in the presence of or with the use of the exhaust gas to form a gaseous mixture comprised of hydrogen, steam, nitrogen, carbon dioxide, and carbon monoxide and any unreformed gas such as methane or propane.

Water vapor or steam and energy necessary for the reforming is supplied at least in part by the exhaust gases from the internal combustion engine. Means are provided for mixing the gaseous mixture exiting the reactor with air to provide a combustible gaseous combination and supplying the combustible combination to a combustion zone of the internal combustion engine where it is combusted to produce exhaust gases. Means are provided for recycling at least a portion of the exhaust gases to the reactor and for discharging the remainder of the exhaust gases to the atmosphere, the exhaust gases containing reduced $NO_x$.

Figure 4:
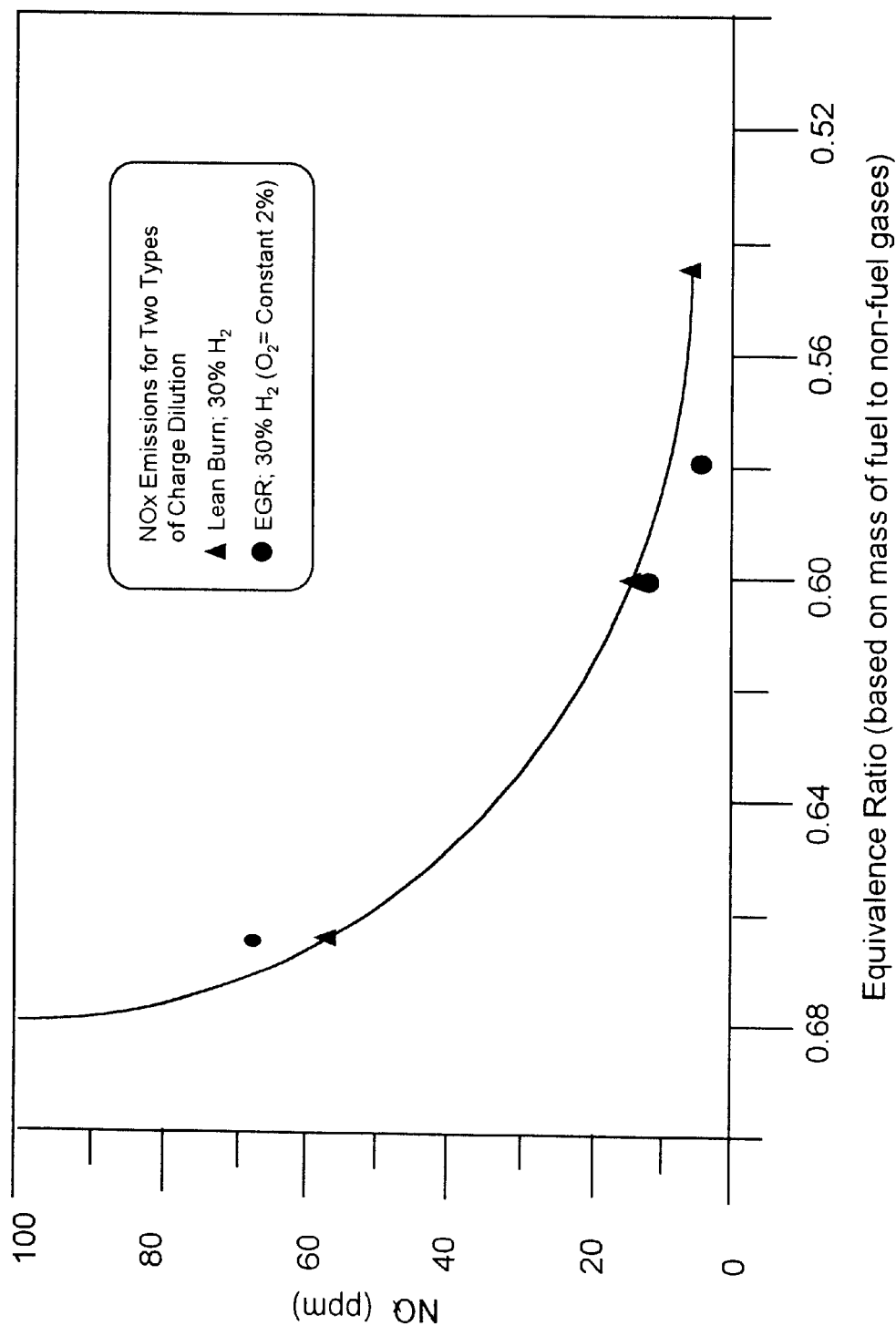
FIG. 4 is a graph illustrating the effectiveness of exhaust gas dilution in using the combination of hydrogen and natural gas to produce near-zero $NO_x$ emissions.

FIG. 4 shows a comparison between $NO_x$ reduction using only lean burn and a combination of exhaust gas recirculation with moderate lean burn. In both cases, the fuel is a mixture of 70% natural gas and 30% hydrogen by volume. The equivalence ratio in FIG. 4 is calculated on the basis of stoichiometric weight based on air fuel ratio divided by the ratio of actual weight of air and exhaust gas to weight of fuel. FIG. 4 shows that $NO_x$ emissions of less than 10 ppm can be obtained by operating an internal combustion engine at very low equivalence ratios obtained by EGR with only 2% exhaust gas oxygen.

Figure 5:
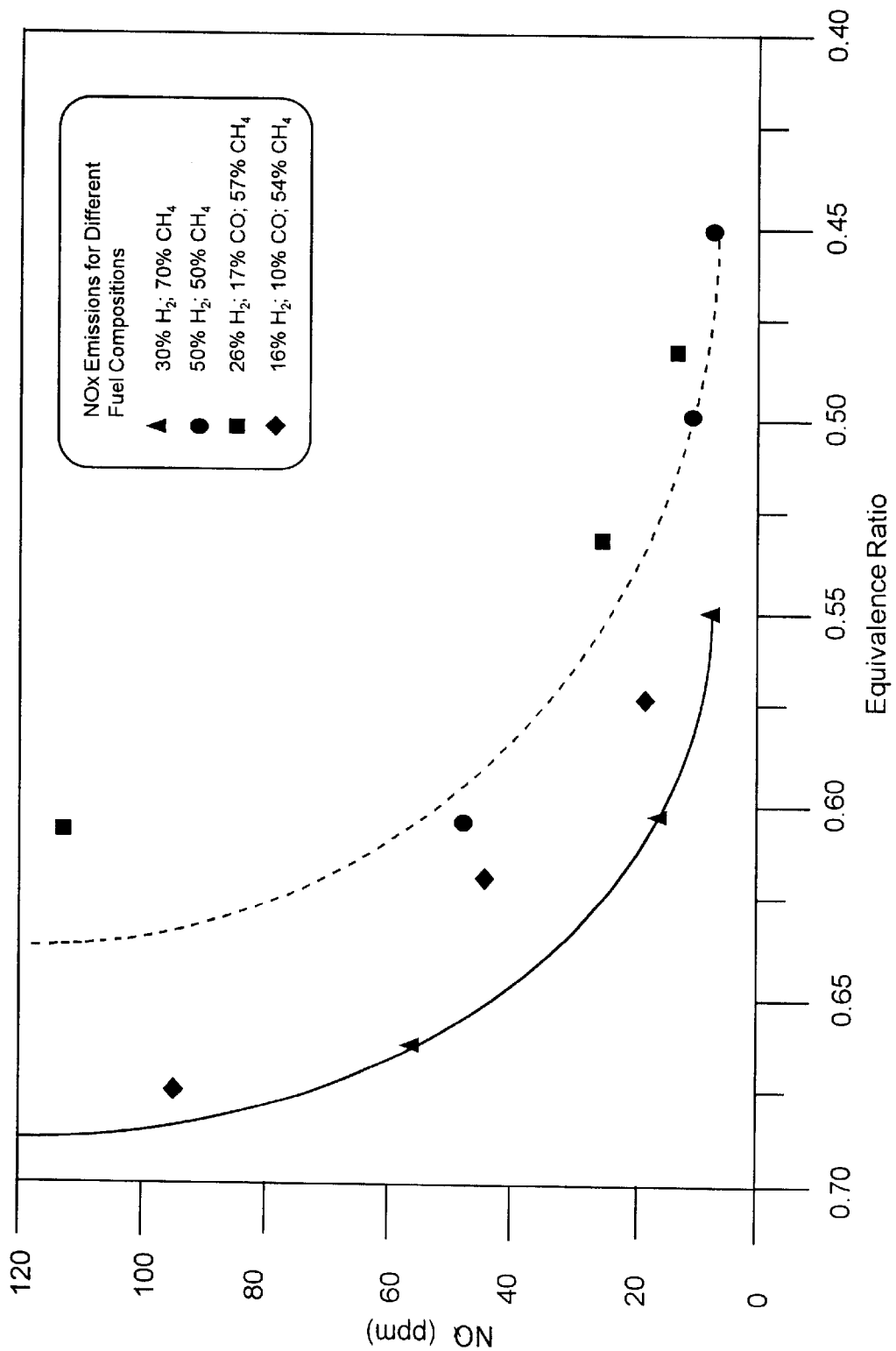
FIG. 5 is a graph illustrating the effectiveness of hydrogen and carbon monoxide mixtures in extending lean burn combustion limits to produce near-zero $NO_x$.

FIG. 5 is a comparison of the effectiveness of adding only hydrogen to natural gas to extend the combustion limit to adding an equivalent molar concentration of hydrogen and carbon monoxide. The equivalence ratio in FIG. 5 is calculated similarly to that described with respect to FIG. 4 except that no exhaust gas recirculation was used for the data shown. FIG. 5 shows that the $NO_x$ formation compared to equivalence ratio for a fuel consisting of 30% hydrogen and 70% natural gas is approximately equivalent to a 26% mixture of hydrogen and carbon monoxide and 74% natural gas. Also, FIG. 5 shows that the $NO_x$ formation compared to equivalence ratio for a fuel consisting of 50% hydrogen and 50% natural gas is approximately equivalent to a 43% mixture of hydrogen and carbon monoxide and 57% natural gas. Thus, this data shows that $NO_x$ emissions can be reduced to less than 10 ppm when a mixture of hydrogen and carbon monoxide is added to natural gas in sufficient quantity to allow engine operation at very low equivalence ratios.

Table 1 shows the results of experiments using a reactor consisting of a column packed with nickel coated alumina rashig rings having a size of 5/16 inch by 5/16 inch. The column was 4 inches in diameter and 24 inches long. Engine exhaust gases were passed through the reactor and methane gas was added upstream. Table 1 shows the composition of the gases entering and exiting the reactor. The results show that methane to hydrogen ratios are attainable which support combustion of highly diluted combustible mixtures. Table 1 shows that all oxygen in the exhaust gas entering the reactor is fully reacted and that carbon monoxide reactions with steam are dominant. That is, for every mole of methane reacted, two moles of hydrogen and one mole of carbon monoxide are produced. Considering the concentration of hydrogen exiting the reactor, it will be seen that the amount of carbon monoxide is extremely low which indicates that most of the carbon monoxide formed reacted with available steam to produce additional hydrogen and carbon dioxide.

(h) combusting said combination mixture in a combustion zone in said engine to produce the first portion of the exhaust gas and a second portion of the exhaust gas, wherein the first portion of the exhaust gas contains up to about 4% oxygen by volume and the second portion of the exhaust gas has near-zero $NO_x$.

2. The method in accordance with claim 1 wherein said gaseous fuel is selected from the group consisting of natural gas, propane gas and combinations thereof.

3. The method in accordance with claim 1 including steam reforming said gaseous fuel at a temperature in the range of 450° to 800° C.

4. The method in accordance with claim 1 including steam reforming said gaseous fuel at a temperature in the range of 500° to 600° C.

5. The method in accordance with claim 1 including reforming at least 10% gaseous fuel added to said reactor.

6. The method in accordance with claim 1 including cooling said gas mixture leaving said reactor and removing water of condensation therefrom.

7. The method in accordance with claim 1 including combining said gas mixture with air in a ratio range of 0.2 to 1.

8. The method in accordance with claim 1 including converting carbon monoxide in the second portion of said exhaust gas to carbon dioxide to provide a vented exhaust gas having near-zero carbon monoxide.

9. The method of claim 1 further comprising the step of feeding the combination mixture into a combustion chamber of the engine.

10. The method of claim 1 wherein the step for combining the gaseous mixture with air occurs outside the engine.

TABLE I

Results of Reactor Test

| Exhaust Gas Flow (g/sec.) | Methane Flow (g/sec.) | Oxygen In (%) | Oxygen Out (%) | Temp. In (° C.) | Temp Out (° C.) | $CO_2$ In (%) | $CO_2$ Out (%) | $H_2$ Out (%) | CO Out (%) | $CH_4$ Out (%) | $CH_4/H_2$ Ratio |
|---|---|---|---|---|---|---|---|---|---|---|---|
| 6.98 | 0.41 | 4.1 | 0.0 | 580 | 535 | 6.5 | 13.2 | 12.7 | 0.55 | 2.3 | 0.18 |
| 6.86 | 0.34 | 0.4 | 0.0 | 575 | 492 | 8.4 | 10.5 | 12.5 | 0.37 | 1.6 | 0.13 |

While the invention has been described in terms of preferred embodiments, the claims appended hereto are intended to encompass other embodiments which fall within the spirit of the invention.

What is claimed is:

1. A method of operating an engine comprising the steps of:
   (a) providing an engine;
   (b) providing a source of gaseous fuel for powering said engine;
   (c) providing a reactor in fluid communication with said engine;
   (d) recycling a first portion of an exhaust gas from said engine to said reactor;
   (e) adding gaseous fuel to said reactor;
   (f) steam reforming said gaseous fuel in said reactor at an oxygen level lower than the lower flammability limit of the gaseous fuel using said first portion of said exhaust gas as a source of heat and water to form a gas mixture comprised of methane, hydrogen and carbon monoxide;
   (g) combining said gas mixture from said reactor with air to provide a combination mixture; and 11. The method of claim 1 wherein the engine comprises at least two combustion chambers, the method further comprising the steps of producing the first portion of the exhaust gas from at least one combustion chamber and producing the second portion of the exhaust gas from the remaining combustion chamber or chambers.

12. A method of operating an engine comprising the steps of:
   (a) providing an engine;
   (b) providing a source of gaseous fuel for powering said engine;
   (c) providing a reactor in fluid communication with said engine;
   (d) recycling a portion of said exhaust gas from said engine to said reactor;
   (e) adding gaseous fuel to said reactor in a ratio range of 0.2 to 0.35 gaseous fuel to exhaust gas;
   (f) steam reforming said gaseous fuel at an oxygen level lower than the lower flammability limit of the gaseous fuel and at a temperature in the range of 450° to 800° C. using said exhaust gas as a source of heat and water to reform at least 10% of said gaseous fuel to form a gaseous mixture comprised of hydrogen and carbon monoxide;

(g) combining said gaseous mixture with air to provide a combination mixture having a ratio range of 0.2 to 1 gaseous mixture to air and an excess oxygen level of between about 0.5 and 4% by volume in the exhaust gas; and (h) combusting said combination mixture in said engine.

13. The method of claim 12 wherein the engine comprises at least two combustion chambers, the method further comprising the steps of producing the recycled portion of exhaust gas from at least one of the combustion chambers.

14. In an improved process for operating an engine to produce an exhaust gas having near-zero $NO_x$, wherein the engine is fueled by natural gas, the improved process comprising:

(a) providing a reactor in fluid communication with said natural gas and exhaust gas from said engine;

(b) recycling a first portion of the exhaust gas from said engine to said reactor;

(c) adding natural gas to said reactor;

(d) steam reforming said natural gas in said reactor at an oxygen level lower than the lower flammability limit of the natural gas using said first portion of exhaust gas as a source of heat and water to form a gas mixture comprised of methane, hydrogen and carbon monoxide;

(e) combining said gas mixture from said reactor with air to provide a combination mixture; and (f) combusting said combination mixture in a combustion zone in said engine to produce the first portion of exhaust gas and a second portion of exhaust gas, wherein the first portion of exhaust gas contains up to about 4% oxygen by volume and the second portion of exhaust gas has near-zero $NO_x$.

15. The method in accordance with claim 14 including commingling said exhaust gas used for steam reforming with said gas mixture to provide a diluted gas mixture for adding to said engine.

16. The process in accordance with claim 14 including steam reforming said natural gas at a temperature in the range of 450° to 800° C.

17. The process in accordance with claim 14 including reforming at least 10% natural gas added to said reactor.

18. The process in accordance with claim 14 including combining said gas mixture with air in a ratio range of 0.2 to 1.

19. The method of claim 14 wherein the step for combining the gas fuel from the reactor with air to form a combination mixture occurs outside the combustion zone.

20. The method of claim 14 wherein the engine comprises at least two combustion chambers, the method further comprising the steps of producing the first portion of exhaust gas from at least one combustion chamber and producing the second portion of exhaust gas from the remaining combustion chamber or chambers.

21. A method of operating an internal combustion engine comprising the steps of:

(a) providing an internal combustion engine;

(b) providing a source of fuel gas for powering said engine wherein the fuel gas is selected from the group consisting of natural gas, propane and combinations thereof;

(c) recycling a first exhaust gas stream from said internal combustion engine to a steam reforming zone wherein said first exhaust gas stream is mixed with said fuel gas;

(d) catalytically steam reforming said fuel gas in said steam reforming zone to form a diluted gaseous mixture containing hydrogen, carbon monoxide and an unreacted portion of the first exhaust gas stream;

(e) combining said diluted gaseous mixture exiting said steam reforming zone with air to provide a combination mixture; and (f) combusting said combination mixture in a combustion zone within said internal combustion engine to produce the first exhaust gas stream and a second exhaust gas stream, wherein the first exhaust gas stream contains up to about 4% oxygen by volume and the second exhaust gas stream contains near-zero $NO_x$.

22. The method of claim 21 wherein the step for combining the diluted gaseous mixture with air occurs outside the combustion zone.

23. The method of claim 21 wherein the engine comprises at least two combustion chambers, the method further comprising the steps of producing the first exhaust gas stream from at least one combustion chamber and producing the second exhaust gas stream from the remaining combustion chamber or chambers.

24. A method of operating an engine comprising the steps of:

(a) providing an engine;

(b) providing a source of gaseous fuel for powering the engine;

(c) providing a reactor in fluid communication with the engine;

(d) recycling a first portion of an exhaust gas from the engine to the reactor;

(e) adding gaseous fuel to the reactor;

(f) steam reforming the gaseous fuel in the reactor at an oxygen level lower than the lower flammability limit of the gaseous fuel using the first portion of the exhaust gas as a source of heat and water to form a gas mixture comprised of methane, hydrogen and carbon monoxide;

(g) combining the gas mixture from the reactor with air to provide a combination mixture;

(h) combusting the combination mixture in a combustion zone in the engine to produce the first portion of exhaust gas and a second portion of exhaust gas, the second portion of exhaust gas having near-zero $NO_x$ and excess oxygen; and (i) reacting carbon monoxide from the second portion of the exhaust gas with the excess oxygen in the second portion of exhaust gas to form carbon dioxide, thereby producing a treated exhaust gas having near-zero carbon monoxide.

25. The method of claim 24 wherein the engine comprises at least two combustion chambers, the method further comprising the steps of producing the first portion of exhaust gas from at least one combustion chamber and producing the second portion of exhaust gas from the remaining combustion chamber or chambers.

* * * * *